US012669581B2

(12) United States Patent
Krolik et al.

(10) Patent No.: US 12,669,581 B2
(45) Date of Patent: Jun. 30, 2026

(54) VIBRATIONAL RADAR BACKSCATTER COMMUNICATIONS

(71) Applicant: Duke University, Durham, NC (US)

(72) Inventors: Jeffrey Krolik, Durham, NC (US); Jessica Centers, Durham, NC (US)

(73) Assignee: DUKE UNIVERSITY, Durham, NC (US)

( * ) Notice: Subject to any disclaimer, the term of this patent is extended or adjusted under 35 U.S.C. 154(b) by 427 days.

(21) Appl. No.: 18/385,109

(22) Filed: Oct. 30, 2023

(65) Prior Publication Data

US 2024/0168130 A1 May 23, 2024

Related U.S. Application Data

(60) Provisional application No. 63/420,314, filed on Oct. 28, 2022.

(51) Int. Cl.
*G01S 13/931* (2020.01)
*G01S 7/41* (2006.01)

(52) U.S. Cl.
CPC .............. *G01S 7/414* (2013.01); *G01S 7/415* (2013.01); *G01S 13/931* (2013.01)

(58) Field of Classification Search
CPC ........ G01S 13/82; G01S 13/931; G01S 7/414; G01S 7/415
See application file for complete search history.

(56) References Cited

U.S. PATENT DOCUMENTS 7,109,910 B1 9/2006 Steinway et al.
2008/0084276 A1 4/2008 Bauchot et al.
2020/0003861 A1* 1/2020 Eriksson .............. G01S 19/485
2021/0133403 A1 5/2021 Martín Antolín et al.

OTHER PUBLICATIONS

Alhassoun, Mohammad, "Theory and Design of Next-Generation Retrodirective Tags and Their Channels," Dec. 2019, 187 pages, Georgia Institute of Technology.
Bakhtiari, S., et al., "Millimeter Wave Sensor for Far-Field Standoff Vibrometry," AIP Conference Proceedings, Mar. 3, 2009, pp. 1641-1648, AIP.

(Continued)

*Primary Examiner* — Timothy A Brainard
(74) *Attorney, Agent, or Firm* — Talem IP Law, LLP

(57) ABSTRACT

A method of performing vibrational radar backscatter communications includes transmitting radar waveforms at millimeter wave frequencies, receiving, from a vibrating transponder, vibrational backscatter of radar waveforms, performing synchronization on the vibrational backscatter to determine a start of an encoded communication message sequence, calculating a predicted symbol sequence based on the encoded communication message sequence, identifying, from one or more predetermined messages, an actionable message from the predicted symbol sequence, and communicating the actionable message to a display of a vehicle or causing the vehicle to take an action. This method can also be performed on a computing system that includes a processor, memory, and instructions stored in the memory and the method can be stored on computer readable storage media.

20 Claims, 5 Drawing Sheets

(56) References Cited

OTHER PUBLICATIONS

Bercman Technologies, "Traffic Sensing with V2X," 2021, Retrieved: Apr. 4, 2023, Retrieved from: https://web.archive.org/web/20230402043848/https://bercman.com/products/traffic-sensing-with-v2x/, 2 pages.
Boccardi, Federico, et al., "Five Disruptive Technology Directions for 5G," IEEE Communications Magazine, Feb. 12, 2014, 11 pages, vol. 52, issue 2.
Cao, Ning, et al., "Joint Radar-Communication Waveform Designs Using Signals From Multiplexed Users," IEEE Transactions on Communications, Aug. 2020 (accessible May 13, 2020), 12 pages, vol. 68, issue 8.
Centers, Jessica, et al., "Vibrational Radar Backscatter Communication Using Resonant Transponding Surfaces," 2022 IEEE 12th Sensor Array and Multichannel Signal Processing Workshop (SAM), Jun. 20, 2022, pp. 71-75, IEEE.
Centers, Jessica, et al., "Vibrational Radar Backscatter Communications," 2021 55th Asilomar Conference on Signals, Systems, and Computers, Oct. 31, 2021 (available Jan. 1, 2021), 5 pages, IEEE.
Chiriyath, Alex R., et al., "Inner Bounds on Performance of Radar and Communications Co-Existence," IEEE Transactions on Signal Processing, Jan. 2016 (accessible Sep. 28, 2015), pp. 464-474, vol. 64, issue 2.
Cnaan-On, Itay, et al., "Multichannel Backscatter Communication and Ranging for Distributed Sensing With an FMCW Radar," IEEE Transactions on Microwave Theory and Techniques, Jul. 1, 2015 (Accessible Jun. 11, 2015), pp. 2375-2383, vol. 63, issue 7.
Cnaan-On, Itay, et al., "Multichannel Radar Backscatter Communication and Localization," 2014 IEEE International Conference on Acoustics, Speech and Signal Processing (ICASSP), May 2014, pp. 76-80, IEEE.
Gross, Geoff A., et al., "Application of Multi-Level Fusion for Pattern of Life Analysis," 2015 18th International Conference on Information Fusion (Fusion), Jul. 2015, pp. 2009-2016, IEEE.
Guidi, Francesco, et al., "Passive Millimeter-Wave RFID Using Backscattered Signals," 2016 IEEE Globecom Workshops (GC Wkshps), Dec. 2016, 6 pages, IEEE.
Huber, Marco F., et al., "On Entropy Approximation for Gaussian Mixture Random Vectors," 2008 IEEE International Conference on Multisensor Fusion and Integration for Intelligent Systems, Aug. 2008, 8 pages, IEEE.
Jakabosky, John, et al., "Gapped Spectrum Shaping for Tandem-Hopped Radar/Communications & Cognitive Sensing," 2016 IEEE Radar Conference (RadarConf), May 2016, 6 pages, IEEE.
Kimionis, John, et al., "Millimeter-Wave Backscatter: A Quantum Leap for Gigabit Communication, RF Sensing, and Wearables," 2017 IEEE MTT-S International Microwave Symposium (IMS), Jun. 2017, pp. 812-815, IEEE.
Kolchinsky, Artemy, et al., "Estimating Mixture Entropy with Pairwise Distances," Entropy, Jul. 14, 2017, pp. 1-17, vol. 19, issue 7.
Labib, Mina, et al., "Coexistence between Communications and Radar Systems: A Survey," URSI Radio Science Bulletin, Sep. 2017, pp. 74-82, vol. 2017, issue 362.
Li, Cheng, et al., "Outer Bounds for a Joint Communicating Radar (Comm-Radar): The Uplink Case," IEEE Transactions on Communications, Feb. 2022 (accessible Nov. 8, 2021), pp. 1197-1213, vol. 70, issue 2.
Li, Huining, et al., "VocalPrint: Exploring a Resilient and Secure Voice Authentication via mmWave Biometric Interrogation," Proceedings of the 18th Conference on Embedded Networked Sensor Systems, Nov. 16, 2020, pp. 312-325, ACM.
Luong, Nguyen Cong, et al., "Radio Resource Management in Joint Radar and Communication: A Comprehensive Survey," Jan. 29, 2021 (accessible Jul. 26, 2020), 34 pages, arXiv.
Martinez, Michael A., et al., "A Classification-Aided Recurrent Neural Network for Tracking in Urban Terrain," 2022 IEEE Radar Conference (RadarConf22), Mar. 21, 2022, 6 pages, IEEE.
Mishra, Kumar Vijay, et al., "Toward Millimeter Wave Joint Radar-Communications: A Signal Processing Perspective," IEEE Signal Processing Magazine, Sep. 2019 (accessible May 2, 2019), 24 pages, vol. 36, issue 5, IEEE.
Molina-Masegosa, Rafael, et al., "Comparison of IEEE 802.11p and LTE-V2X: An Evaluation With Periodic and Aperiodic Messages of Constant and Variable Size," IEEE Access, 2020 (accessible Jul. 3, 2020), pp. 121526-48, vol. 8.
Neuvition, Inc, "V2X Sensors: LiDAR and Radar," Neuvition, Jun. 22, 2022, Retrieved: Oct. 27, 2023, Retrieved from: https://www.neuvition.com/media/v2x-sensor.html, 3 pages.
Nguyen, Thi Phuoc Van, et al., "Review-Microwave Radar Sensing Systems for Search and Rescue Purposes," Sensors, Jun. 28, 2019 (accessible Jun. 28, 2019), 24 pages, vol. 19, issue 13.
Niu, Jin-Ping, et al., "An Overview on Backscatter Communications," Journal of Communications and Information Networks, Jun. 2019, pp. 1-14, vol. 4, issue 2.
Paul, Bryan, et al., "Survey of RF Communications and Sensing Convergence Research," IEEE Access, Feb. 25, 2017 (accessible Dec. 13, 2016), pp. 252-270, vol. 5.
Rakshit, Raj, et al., "On Characterization of Vibration Measurement Using Microwave Doppler Radar," 2018 IEEE Sensors, Oct. 2018, 4 pages, IEEE.
Roberton, M., et al., "Integrated Radar and Communications Based on Chirped Spread-Spectrum Techniques," IEEE MTT-S International Microwave Symposium Digest, Jun. 2003, pp. 611-614, vol. 1, IEEE.
Rodenbeck, Christopher T., et al., "Vibrometry and Sound Reproduction of Acoustic Sources on Moving Platforms Using Millimeter Wave Pulse-Doppler Radar," IEEE Access, Feb. 13, 2020 (accessible Feb. 4, 2020), pp. 27676-86, vol. 8.
Sahin, Cenk, et al., "A Novel Approach for Embedding Communication Symbols into Physical Radar Waveforms," 2017 IEEE Radar Conference (RadarConf), May 2017, 6 pages, IEEE.
Soltanaghaei, Elahe, et al., "Millimetro: mmWave Retro-Reflective Tags for Accurate, Long Range Localization," Proceedings of the 27th Annual International Conference on Mobile Computing and Networking, Sep. 9, 2021, pp. 69-82, ACM.
Stockman, H., "Communication by Means of Reflected Power," Proceedings of the IRE, Oct. 31, 1948, pp. 1196-1204, vol. 36, issue 10.
Tonolini, Francesco, et al., "Networking across Boundaries: Enabling Wireless Communication through the Water-Air Interface," Proceedings of the 2018 Conference of the ACM Special Interest Group on Data Communication, Aug. 7, 2018, pp. 117-131, ACM.
Liao, Xin, et al., "Non-Contact Vibration Retrieval and Performance Analysis Based on LFMCW Radar," 2016 IEEE International Conference on Signal Processing, Communications and Computing (ICSPCC), Aug. 2016, 4 pages, IEEE.
Yang, Yinan et al., "Target Classification and Pattern Recognition Using Micro-Doppler Radar Signatures," Seventh ACIS International Conference on Software Engineering, Artificial Intelligence, Networking, and Parallel/Distributed Computing (SNPD'06), Jun. 2006, 5 pages, IEEE.
Yu, J., et al., "MIMO Multipath Clutter Mitigation for GMTI Automotive Radar in Urban Environments," IET International Conference on Radar Systems (Radar 2012), Oct. 2012, 5 pages, Institution of Engineering and Technology.
Yucek, Tevfik, et al., "A Survey of Spectrum Sensing Algorithms for Cognitive Radio Applications," IEEE Communications Surveys & Tutorials, Mar. 4, 2009, pp. 116-130, vol. 11, issue 1.
Zhang, Xumiao, et al., "EMP: Edge-Assisted Multi-Vehicle Perception," Proceedings of the 27th Annual International Conference on Mobile Computing and Networking, Oct. 25, 2021, pp. 545-558, ACM.
Correia, Ricardo, et al., "Continuously Power Delivering for Passive Backscatter Wireless Sensor Networks," IEEE Transactions on Microwave Theory and Techniques, Nov. 2016 (available Sep. 21, 2016), 9 pages, vol. 64, issue 11.
Hester, Jimmy G. D., et al., "A Mm-Wave Ultra-Long-Range Energy-Autonomous Printed RFID-Enabled van-Atta Wireless Sen-

(56) References Cited

OTHER PUBLICATIONS sor: At the Crossroads of 5G and IoT," 2017 IEEE MTT-S International Microwave Symposium (IMS), Jun. 2017, pp. 1557-1560, IEEE.

Kevan, Tom, "The V2X Standards Faceoff," Digital Engineering 247, Sep. 1, 2018, Retrieved: Oct. 6, 2025, Retrieved from: https://www.digitalengineering247.com/article/the-v2x-standards-faceoff, 15 pages.

Kimionis, John, et al., "Increased Range Bistatic Scatter Radio," IEEE Transactions on Communications, Mar. 2014 (available Feb. 18, 2014), 14 pages, vol. 62, issue 3.

Matos, Diogo, et al., "Millimeter-Wave BiCMOS Backscatter Modulator for 5 G-IoT Applications," IEEE Microwave and Wireless Components Letters, Feb. 2021 (accessible Dec. 16, 2020), pp. 173-176, vol. 31, issue 2.

Schmid, Christian M., et al., "Millimeter-Wave Phase-Modulated Backscatter Transponder for FMCW Radar Applications," 2011 IEEE MTT-S International Microwave Symposium, Jun. 2011, 4 pages, IEEE.

Senjanović, Ivo, et al., "An Approximate Analytical Procedure for Natural Vibration Analysis of Free Rectangular Plates," Thin-Walled Structures, Oct. 2015 (available Jul. 9, 2015), pp. 101-114, vol. 95.

* cited by examiner

200

202
Transmitting millimeter radar waves

204
Receiving, from a vibrating transponder, vibrational backscatter millimeter radar waves 206
Determining an angle and range of the vibrating transponder from the vibrational backscatter of the radar waveforms 208
Performing synchronization on the vibrational backscatter millimeter radar waves to determine a start of a vibrational backscatter communication message sequence 210
Calculating a predicted symbol sequence based on the vibrational backscatter communication message sequence 212
Identifying, from one or more predetermined messages, an actionable message from the predicted symbol sequence 214
Communicating the actionable message to a display of a vehicle or causing the vehicle to take an action

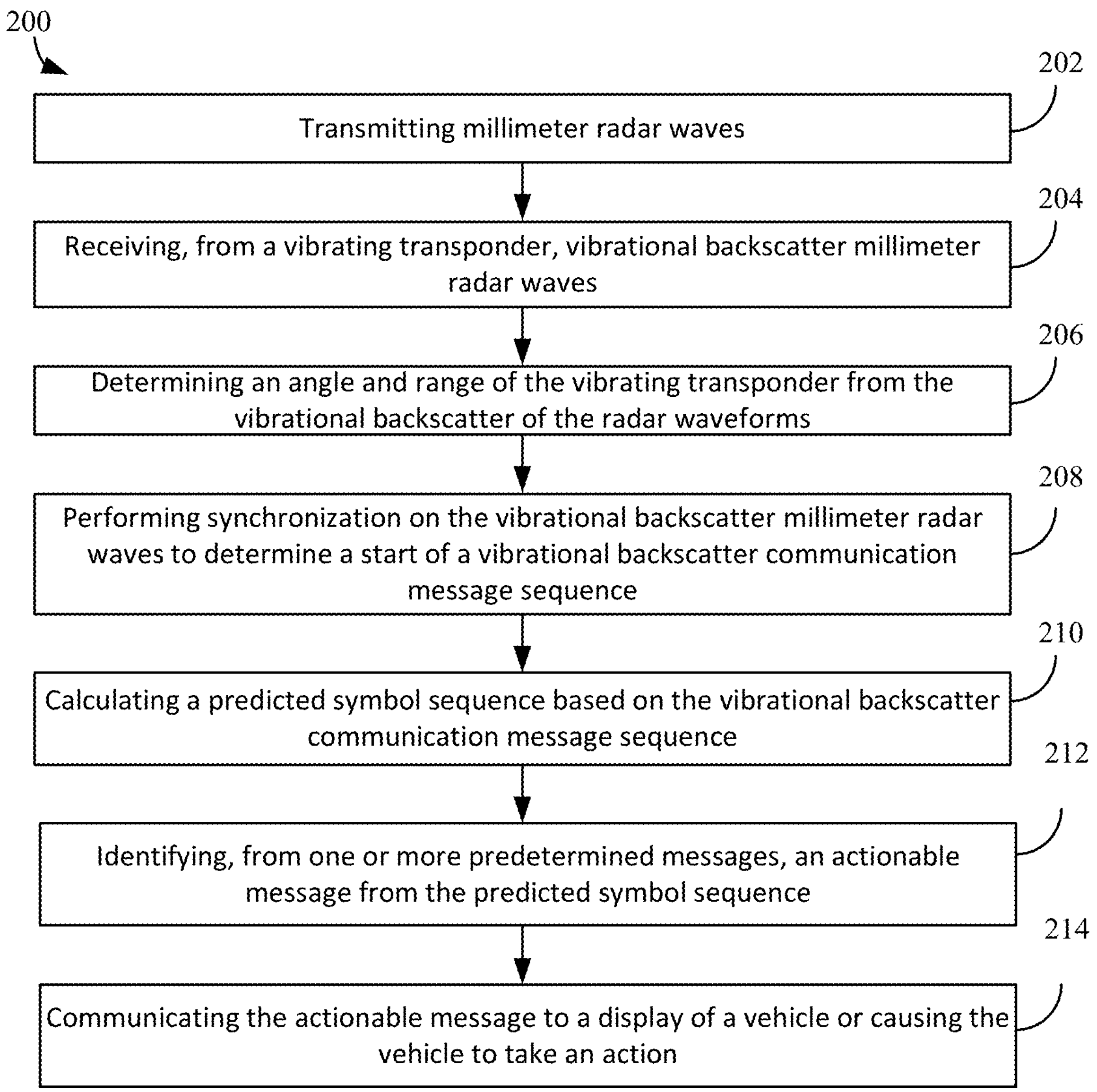

VIBRATIONAL RADAR BACKSCATTER COMMUNICATIONS

CROSS-REFERENCE TO RELATED APPLICATIONS

This application claims the benefit of U.S. Provisional Application Ser. No. 63/420,314, filed Oct. 28, 2022.

GOVERNMENT RIGHTS NOTICE

This invention was made with Government support under Federal Grant no. CNS-2112562 awarded by the National Science Foundation. The Federal Government has certain rights to this invention.

BACKGROUND

Advances in the vehicle industry, specifically with respect to driver assistance systems and autonomous driving systems, have led to millimeter wave (mmW) radars becoming inexpensive and widely available in newer-model vehicles. When mmW radar waves are transmitted by a vehicle's driver assistance systems and/or autonomous driving system, the mmW radar waves contact an object in their path and are reflected and/or backscattered back to the mmW radar system's antenna. Processing of the captured signal enables position and motion of that object relative to the vehicle to be determined. However, no additional messaging information is currently available via these systems.

Traditional backscatter communications utilize backscatter modulation appearing as a change in amplitude due to a change in transponder impedance. Unlike radio frequency identification (RFID) systems operating at ultra-high frequencies (UHF), backscatter communications at mmW frequencies pose additional challenges for additional messaging information, such as the need for complex and expensive retro-directive antenna arrays to achieve adequate signal returns at these frequencies. These complex and expensive retro-directive antenna arrays therefore present a significant barrier in the use of existing mmW radar systems being utilized as a form of communication to alert vehicles and their drivers of potentially hazardous conditions (as well as other important messaging opportunities) beyond their existing use. Therefore, a need exists for a system that can utilize existing mmW radar systems on vehicles as a form of communicating important messages to vehicles and/or their drivers without the need for complex and/or expensive additional devices.

BRIEF SUMMARY

Vibrational radar backscatter communications (VRBC) systems and methods are disclosed herein. Advantageously, the VRBC systems and methods allow for messaging communications beyond position and motion information without the need for complex and expensive add-ons (e.g., retro-directive antenna arrays) that would otherwise be required using traditional mmW radar systems that already exist in vehicles with driver assistance systems and/or autonomous driving systems. Furthermore, by implementing the described VRBC systems and methods, roadway safety is improved by allowing for encoded messages to be delivered and actions to be taken in a near instantaneous fashion even in conditions (e.g., fog, rain, and/or at night) that impede other types of driver assistance systems and/or autonomous driving systems (e.g., camera systems).

A method of utilizing vibrational radar backscatter communications includes transmitting radar waveforms at millimeter wave frequencies, receiving, from a vibrating transponder, vibrational backscatter of the radar waveforms, determining an angle and range of the vibrating transponder from the vibrational backscatter of the radar waveforms, performing synchronization on the vibrational backscatter of the radar waveforms to determine a start of an encoded communication message sequence, decoding a predicted symbol sequence based on the encoded communication message sequence, identifying, from one or more predetermined messages, an actionable message from the predicted symbol sequence, and communicating the actionable message to a display of a vehicle or causing the vehicle to take an action.

In some cases, the vibrational backscatter results in phase modulation of the radar waveforms. In some cases, the method further includes receiving, from one or more second vibrating transponders, one or more second vibrational backscatter of the radar waveforms, determining a second angle and range of the one or more second vibrating transponders from the one or more second vibrational backscatter of the radar waveforms, isolating the vibrational backscatter from the vibrating transponder based on the determined angle and range of the vibrating transponder and isolating the one or more second vibrational backscatter from the one or more second vibrating transponders based on the angle and range of the one or more second vibrating transponders, performing synchronization on the one or more second vibrational backscatter to determine a second start of a second encoded communication message sequence, decoding a second predicted symbol sequence based on the second encoded communication message sequence, identifying, from the one or more predetermined messages, a second actionable message from the second predicted symbol sequence, and communicating the second actionable message to the display of the vehicle or causing the vehicle to take a second action.

In some cases, the method further includes performing bandpass filtering on the vibrational backscatter of the radar waveforms to separate the vibrational backscatter from any other vibrational backscatter in range. In some cases, the method further includes performing beamforming on the vibrational backscatter of the radar waveforms to separate the vibrational backscatter from any other vibrational backscatter in angle. In some cases, the method further includes performing clutter filtering on the vibrational backscatter to separate the vibrational backscatter from backscatter of non-vibrating objects. In some cases, performing the synchronization on the vibrational backscatter includes performing the synchronization on the clutter filtered vibrational backscatter to determine the start of the encoded communication message sequence. In some cases, receiving, from the vibrating transponder, the vibrational backscatter includes performing constant false alarm rate detection to detect the vibrational backscatter of the radar waveforms.

In some cases, the method further includes analyzing Doppler frequencies of the vibrational backscatter of the radar waveforms to determine that the vibrational backscatter of the radar waveforms include indications of displacements of the vibrating transponder at frequencies of interest. In some cases, performing the synchronization on the vibrational backscatter to determine the start of the encoded communication message sequence includes identifying a time index associated with a peak in a correlation or a peak in coherence between the vibrational backscatter and a known preamble to determine the start of the encoded communication message sequence.

In some cases, decoding the predicted symbol sequence based on the encoded communication message sequence includes modeling a known set of symbols and characteristics of the vibrating transponder and comparing against the encoded communication message sequence. In some cases, decoding the predicted symbol sequence based on the encoded communication message sequence further includes: employing message coding constraints on the encoded communication message sequence, defining possible message sequences based on a Markov model, and using a Viterbi algorithm to mitigate inter-symbol interference errors caused by vibrating surface resonant effects.

A computing system that includes a processor, memory, and instructions stored in the memory that when executed by the processor, directs the computing device to perform the method described above.

A computer readable storage media having instructions stored thereon that when executed by a processing system direct the processing system to perform the method described above is also disclosed herein.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 2 illustrates a flowchart for a method implemented by a vibrational radar backscatter communications system.

DETAILED DESCRIPTION

Vibrational radar backscatter communications (VRBC) systems and methods are disclosed herein. Advantageously, the VRBC systems and methods allow for messaging communications beyond position and motion information without the need for complex and expensive add-ons (e.g., retro-directive antenna arrays) that would otherwise be required using traditional mmW radar systems that already exist in vehicles with driver assistance systems and/or autonomous driving systems. Furthermore, by implementing the described VRBC systems and methods, roadway safety is improved by allowing for specific messages to be delivered and actions to be taken in a near instantaneous fashion even in conditions (e.g., fog, rain, and/or at night) that impede other types of driver assistance systems and/or autonomous driving systems (e.g., camera systems).

Figure 1:
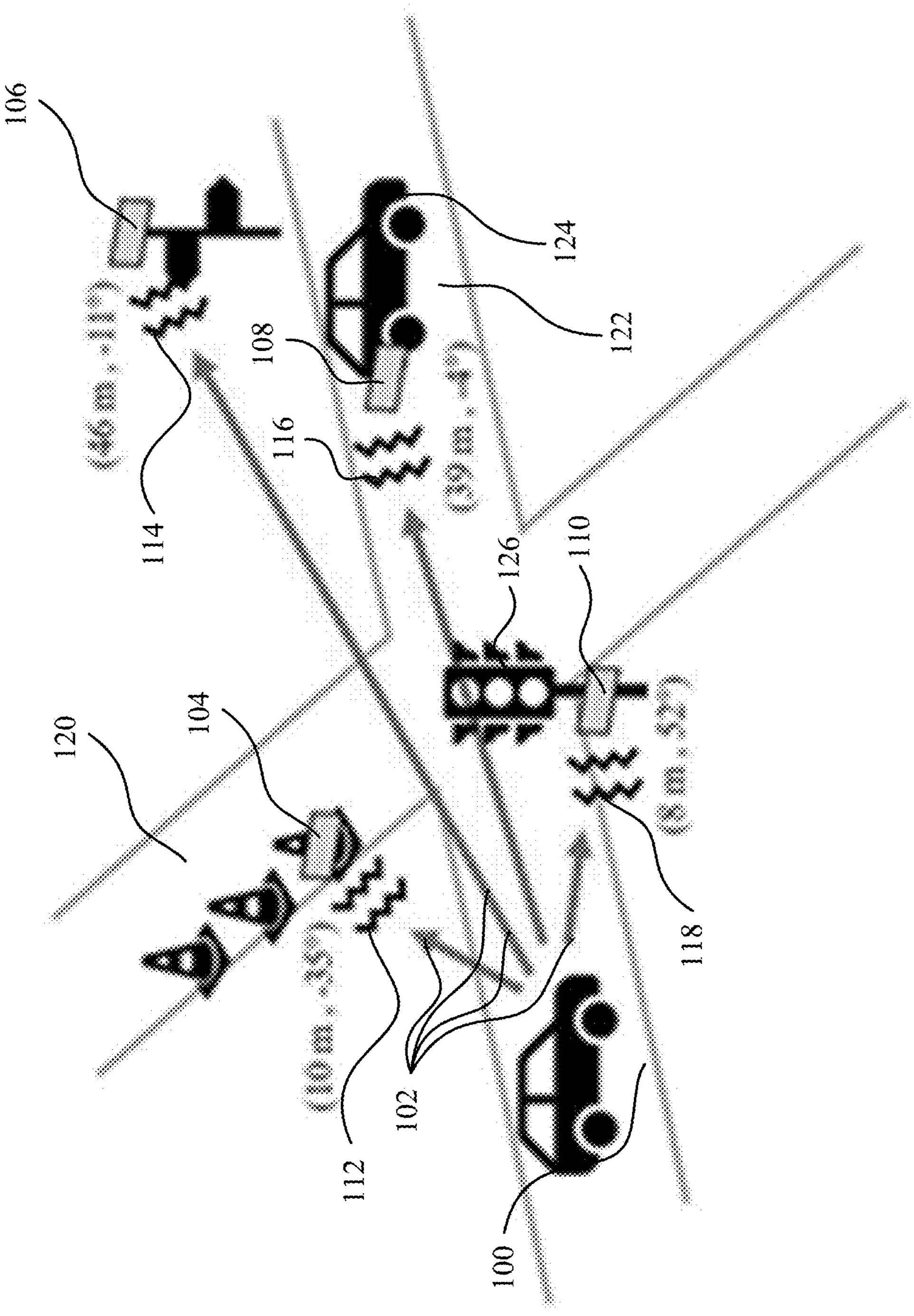
FIG. 1 illustrates an example environment for implementing vibrational radar backscatter communications (VRBC) systems and methods.

FIG. 1 illustrates an example environment for implementing vibrational radar backscatter communications (VRBC) systems and methods. Referring to FIG. 1, a vehicle 100 having a VRBC system transmits radar waveforms 102 at millimeter wave frequencies that make contact with a vibrating transponder 104, 106, 108, 110. The radar waveforms 102 are phase modulated by displacements caused by vibrations in a surface of the vibrating transponder 104, 106, 108, 110 and returned to the VRBC system of the vehicle 100 as vibrational backscatter 112, 114, 116, 118 of the radar waveforms 102. Upon receiving the vibrational backscatter 112, 114, 116, 118 the VRBC system of the vehicle 100 performs a method (e.g., method 200 of FIG. 2) to identify an actionable message and communicate that actionable message to a display of the vehicle 100 and/or to cause the vehicle 100 to take an action. For example, the vibrational backscatter 112, 114, 116, 118 can include changes to the transmitted radar waveforms 102 that are measured in the received signals (e.g., vibrational backscatter 112, 114, 116, 118) during the method to identify the actionable message.

For example, the vibrating transponder 104 may communicate a message that indicates the left shoulder of roadway 120 is obstructed (e.g., with that message being encoded into vibrational backscatter 112 via displacements caused by vibrations in a surface of the vibrating transponder 104). An actionable message may be communicated to a display of the vehicle 100 that indicates the left shoulder of roadway 120 is obstructed and/or cause the vehicle 100 to provide an appropriate buffer between the vehicle 100 and the left shoulder of roadway 120 if/when the vehicle 100 turns onto roadway 120.

As another example, the vibrating transponder 106 may communicate a message that indicates roadway 122 is shut down some distance (e.g., one mile) ahead. An actionable message may be communicated to a display of the vehicle 100 that indicates roadway 122 is shut down some distance ahead and/or cause a navigation system of the vehicle 100 to find an alternate route to a desired destination.

As another example, the vibrating transponder 108 may communicate a message that indicates vehicle 124 is braking or disabled. An actionable message may be communicated to a display of the vehicle 100 that indicates the vehicle 124 is braking or disabled and/or cause the vehicle 100 to decelerate appropriately with respect to the vehicle 124 and/or to cause the driver assistance system and/or autonomous driving system of the vehicle 100 to switch lanes (e.g., in the case that roadway 122 has an open lane).

As another example, vibrating transponder 110 may communicate a message that indicates traffic light 126 will be cycling to red momentarily. An actionable message may be communicated to a display of the vehicle 100 that indicates traffic light 126 will be cycling to red momentarily and/or cause the vehicle 100 to decelerate appropriately to stop at the traffic light 126 and/or to continue through the traffic light 126 (e.g., depending on distance and speed of the vehicle 100 and the time until the traffic light 126 will turn red.

It should be understood that the vibrating transponders 104, 106, 108, 110 are not the focus of the invention disclosed herein. However, it should also be understood that vibrating transponders may also be mobile (e.g., could be placed on a side of a roadway as part of a reflective warning triangle) and be capable of communicating a variety of messages (e.g., with any message being encoded into vibrational backscatter via displacements caused by vibrations in a surface of the vibrating transponder).

FIG. 2 illustrates a flowchart for a method implemented by a vibrational radar backscatter communications system. Referring to FIG. 2, a method 200 implemented by a vibrational radar backscatter communications system includes transmitting (202) radar waveforms at millimeter wave frequencies and receiving (204), from a vibrational transponder, vibrational backscatter of the radar waveforms.

For example, the radar waveforms that are transmitted (202) can be defined as $$s_{TX}(X) = \alpha_{TX} e^{j2\pi f_0 t} \sum_{g=0}^{G-1} u_p(t - gT_{PRI} - t_0) \tag{1}$$

where $\alpha_{TX}$ is the gain/attenuation associated with the transmitter, $f_0$ is the start frequency of the chirps, G is the number of chirps sent, $T_{PRI}$ is the pulse repetition interval, $t_0$ is the start time of the whole signal, and $u_p(t)$ is the traditional frequency modulated continuous wave (FMCW) baseband waveform. Next, $$u_p(t) = \begin{cases} e^{j\pi\beta t^2} & 0 \le t < T \\ 0 & \text{otherwise} \end{cases} \tag{2}$$

is defined where T is the active duration of a chirp which must be less than or equal to $T_{PRI}$. The chirp slope is $$\beta = \frac{B}{T}$$

and B is the bandwidth of the chirp.

Only the return (e.g., the received (204) vibrational backscatter of the radar waveforms) containing the target is desired for the purposes of VRBC, so the method 200 can continue under the assumption that the full return is only from the beam in the direction of the target after having performed beamforming. The received (204) vibrational backscatter results in a phase modulation of the transmitted (202) radar waveforms. When a beam output contains only a single vibrating target transponder, the received signal consists of the vibrational backscatter of the transmitted signal from the vibrating transponder, $s_{RX_{tar}}(t)$; clutter, $s_{RX_{clt}}(t)$ and additive white Gaussian noise (AWGN), $\tilde{n}(t)$;

$$s_{RX}(t) = s_{RX_{tar}}(t) + s_{RX_{clt}}(t) + \tilde{n}(t) \tag{3}$$

Assume the start time, $t_0$, is 0. The return from the target is modeled as a point scatterer $$s_{RX_{tar}}(t) = \tilde{\alpha}_{tar} e^{j2\pi f_0 (t - \tau_{tar}(t))} \sum_{g=0}^{G-1} u_p(t - \tau_{tar}(t) - gT_{PRI}) \tag{4}$$

where $\tau_{tar}(t)$ is the round trip delay observed due to the range from the radar to the target. This equation models the cases of a retro-directive reflector and/or surface backscatter with roughness much less than the range resolution of the radar. In the anything-to-vehicle communication scenario, the former case is exemplified when the vibrating transponder is a traffic sign or license plate at ranges greater than a few meters.

Assuming the radar and target move at some bulk velocity such as when the radar is on a moving vehicle or the vibrational surface is mounted on another moving vehicle, the delay can be written as $$\tau_{tar}(t) = \frac{2}{c}(r_{tar} + v_{tar} t - v_{radar} + d(t)) \tag{5}$$

The term $r_{tar}$ is the initial range between the transponder target and VRBC radar, $v_{tar}$ is the radial velocity of the target, $v_{radar}$ is the radial velocity of the radar, and d(t) is the vibrating transponder's surface displacement. Here, assuming radar-facing surfaces, the object's radial displacement is significant. Equation 5 has also been written assuming that positive radial velocities are in the forward direction from the perspective of the radar.

In equation 4, $\tilde{\alpha}_{tar}$ is the amplitude after scaling due to signal propagation as a function of the target's range and radar cross section (RCS). The tilde indicates that this term is complex. Specifically, all $\tilde{\alpha}$ terms going forward are complex Gaussian random variables following the Swerling model.

The target-directed clutter return within a beam can be modeled as a sum of K point scatterers $$s_{RX_{clt}}(t) = \sum_{k=1}^{K} \tilde{\alpha}_k e^{j2\pi f_0 (t - \tau_k(t))} \sum_{g=0}^{G-1} u_p(t - \tau_k(t) - gT_{PRI}) \tag{6}$$

Each clutter point indexed by k has delay $$\tau_k(t) = \frac{2}{c}(r_k - v_{radar,k} t) \tag{7}$$

where $r_k$ is the range of the $k^{th}$ clutter point, while $v_{radar,k}$ is the radial velocity of the radar with respect to the $k^{th}$ clutter point. The radial velocity relates to the absolute velocity and azimuthal angle $\theta_k$ measured from the direct of motion of the point via $$v_{radar,k} = v_{radar,k}^{(abs)} \cos\theta_k.$$

Because this return contains clutter points from the full beam, there exists multiple clutter points for which their ranges are equal but their complex amplitudes and radial velocities for the radar differ. This subset of points represents the clutter along the arc that spans the beamwidth of the radar at a particular range. The Doppler spread due to the radar's absolute motion can then be calculated using $$\Delta f_D = \frac{2}{\lambda_0} v_{radar}^{(abs)} \Delta\cos\theta_k \tag{8}$$

where $\Delta \cos \theta_k$ denotes the difference in $\cos \theta$ due to the edge points of the beamwidth of the radar.

Following traditional FMCW radar processing methods, the entire beam return, equation 3, is first de-chirped by multiplying the received signal by the complex conjugate of the transmitted, $$s_{TX}(t)s_{RX}^*(t) = \tilde{\alpha}_{tar} e^{j2\pi f_0 \tau_{tar}(t)} \sum_{g=0}^{G-1} z_{tar}(t - gT_{PRI}) + \sum_{k=1}^{K} \tilde{\alpha}_k e^{j2\pi f_0 \tau_k(t)} \sum_{g=0}^{G-1} z_k(t - gT_{PRI}) + \tilde{n}(t) \tag{9}$$

where $$z_{obj}(t) = \begin{cases} e^{j\pi\beta\left(2\tau_{obj}(t)t - \tau_{obj}^2(t)\right)} & \tau_{obj}(t) \le t < T \\ 0 & \text{otherwise} \end{cases} \tag{10}$$

In radar processing, $\tau_{obj}(t)$ is typically constant within a chirp, i.e., the object is close to stationary, $z_{obj}(t)$ simplifies to a complex sinusoid with a frequency proportional to range. This is an assumption that VRBC cannot always make however, due to the frequencies of vibration being similar to the radar's PRF. For that reason, the generalized representation is utilized. Equation 9 is used in part to perform target isolation (e.g., differentiating between vibrating transponders and other signals that are not part of a single vibrating transponder's phase modulated signal).

To reach equation 9, target detection must first be completed. Target detection can include using constant false alarm rate (CFAR) detection to find VRBC transponders in range-bearing space. For example, receiving (204), from the vibrating transponder, vibrational backscatter of the radar waveforms can include performing constant false alarm rate detection to detect the vibrational backscatter of the radar waveforms. Performing CFAR detection can also detect objects in the scene that are not being used for VRBC as well. In some cases, to ensure that only vibrating transponders are decoded through the remainder of the VRBC processing chain, the Doppler of all detected objects is analyzed to determine whether they consist of displacements at frequencies specific to VRBC. In some cases, the method 200 can further include analyzing Doppler frequencies of the vibrational backscatter of the radar waveforms to determine that the vibrational backscatter of the radar waveforms include indications of displacements of the vibrating transponder at frequencies of interest. Parameter estimation of each transponder's angle and range is then calculated. Accordingly, the method 200 further includes determining (206) an angle and range of the vibrating transponder from the vibrational backscatter of the radar waveforms.

In some cases, the method 200 includes separating targets (e.g., one or more vibrating transponders) within a single beam at different ranges. Traditional FMCW range processing consists of organizing the signal into a matrix of fast- and slow-time samples, or samples within chirp versus samples across chirps. Usually a fast Fourier transform is taken in fast-time to provide a matrix of range versus slow-time samples. This allows range processing to simply be the act of keeping only the slow-time vector associated with the range desired. Because VRBC vibrations lead to Doppler movements that are not constant or insignificant within a chirp, VRBC can instead bandpass filter the full de-chirped beam return in order to separate signals in range. This leaves the signal in the traditionally labeled fast-time domain. In some cases, the method 200 further includes performing bandpass filtering on the vibrational backscatter to separate the vibrational backscatter from any other backscatter (e.g., vibrational backscatter) in range. In some cases, the method 200 further includes performing beamforming on the vibrational backscatter to separate the vibrational backscatter from any other backscatter in angle.

Figure 3:
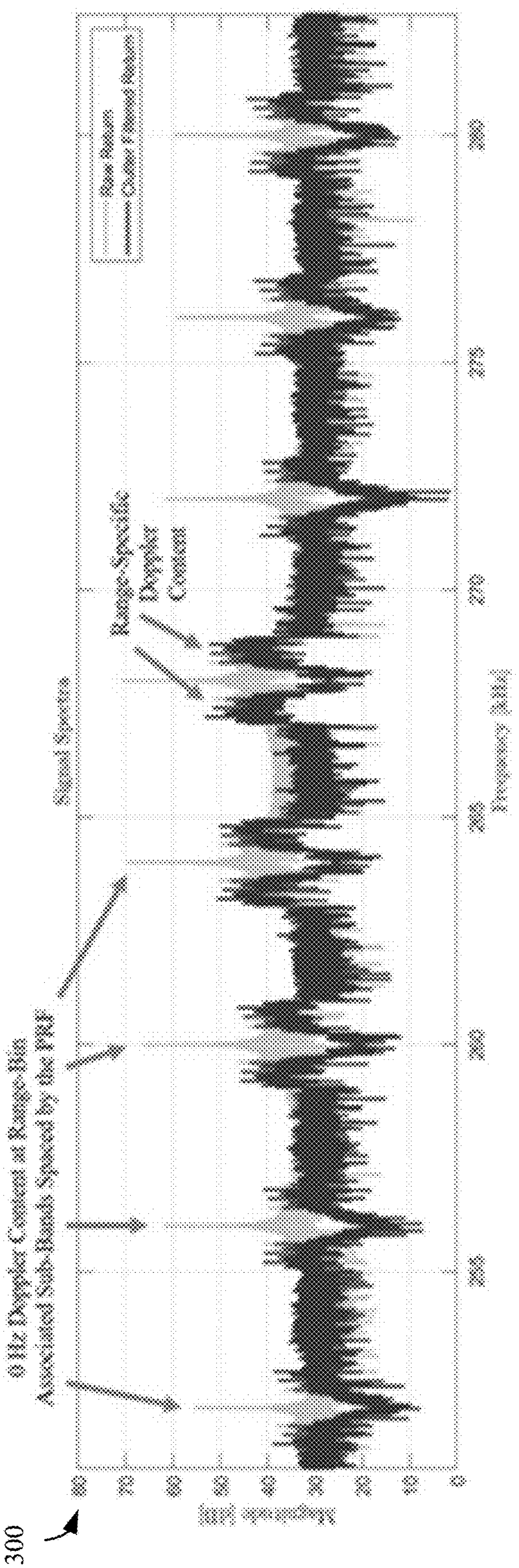
FIG. 3 illustrates energy due to a target's displacement existing at subbands outside of the one most closely associated with the range of the target.

FIG. 3 illustrates energy due to a target's displacement (e.g., displacement of a surface of a vibrating transponder) existing at subbands outside of the one most closely associated with the range of the target. To create the graph 300 illustrated in FIG. 3, an assumed fully reflective aluminum license plate-sized transponder was simulated at 2 meters distance (~30 dB target power). The message signal simulated was a 100-symbol long, M-ary FSK sequence of vibrations at 800, 600, and 400 Hz. Bandpass filtering also causes the AWGN term to become band-limited. Band-limited noise is denoted as $\tilde{\eta}(t)$.

For each individual transponder detected and isolated, clutter filtering and independent synchronization can be conducted. The method 200 further includes performing (208) synchronization on the vibrational backscatter of the radar waveforms to determine a start of an encoded communication message sequence. Typically, clutter filtering is done in the slow-time domain. Since the described VRBC keeps the signal in fast-time, this would mathematically appear as $$y(t) = \sum_{n=0}^{N} w_n s_{TX}(t + nT_{PRI}) s_{RX}^*(t + nT_{PRI}) \tag{11}$$

Here, N is the order of the filter and $w_n$ is the filter coefficient for the $n^{th}$ tap. When clutter is stationary relative to the radar (i.e., $v_{radar}=0$), the only non-zero filter coefficients can be $w_0=1$ and $w_1=-1$. In other words, because stationary clutter is consistent across chirps, clutter filtering results in subtracting off the previous chirp to mitigate the portion of the return that is consistent. The frequency response of such a filter would appear as a series of notches at multiples of the PRF. In some cases, the method 200 further includes performing clutter filtering on the vibrational backscatter to separate the vibrational backscatter from backscatter of non-vibrating objects. In some cases, performing (208) the synchronization on the vibrational backscatter includes performing the synchronization on the clutter filtered vibrational backscatter to determine a start of the encoded communication message sequence.

Referring back to FIG. 3, spectra of a VRBC channel is illustrated both before and after clutter filtering. In practice, it is possible that clutter could be non-stationary. Take for example when $v_{radar} \neq 0$ or clutter consists of leaves from a nearby tree moving in the wind. In these cases, filter weights will be less trivial and methods to estimate the filter weights such as using space-time adaptive processing techniques would be required.

After clutter filtering, synchronization can occur to find the start of an encoded communication message sequence. This is done for each transponder signal individually. In some cases to achieve synchronization, a known preamble sequence with an autocorrelation function that results in a sharp peak is used in all vibrational message signals. The time index associated with a peak in the correlation or a peak in coherence (e.g., using a magnitude squared coherence) between a VRBC signal and known preamble would then provide the sequence start time. In some cases, performing (208) the synchronization on the vibrational backscatter to determine the start of the encoded communication message sequence includes identifying a time index associated with a peak in a correlation or a peak in coherence between the vibrational backscatter and a known preamble to determine the start of the encoded communication message sequence. The peak in correlation and/or peak in coherence can indicate moments of a linear relationship between a known preamble (e.g., from a sourcing signal) and the vibrational backscatter.

Upon synchronization, the radar model for VRBC return is now given as $$y(t)=y_{tar}(t)+\tilde{\eta}(t) \quad (12)$$

where $$y_{tar}(t)=\tilde{\alpha}_{tar}\sum_{n=0}^{N} w_n e^{j2\pi f_0 \tau_{tar}(t+nT_{PRI})}\sum_{g=-n}^{G-1-n} z_{tar}(t-gT_{PRI})$$

Recall that the message-encoded displacement d(t) appears within the delay $\tau_{tar}(t+nT_{PRI})$ using equation 5.

The displacement of a VRBC surface, d(t), can be written as a function of an excitation signal causing the vibrations, x(t). The excitation signal is equivalently the encoded message signal. Consider an excitation signal that consists of Q consecutive single symbol excitations, $$x(t)=\sum_{q=1}^{Q} x_q(t-(q-1)T_{sym}) \quad (13)$$

where each $x_q \in \mathcal{X}$. The set X contains M different symbol excitations that have non-zero values only from $0 \le t < T_{sym}$, $\mathcal{X}=\{x^{(1)}(t), x^{(2)}(t), \ldots, x^{(M)}(t)\}$. The excitation length is the same for all M possible symbols and is notated as $T_{sym}$ seconds or $L_{sym}$ samples long, where $L_{sym}=T_{sym}f_s$. Here, the sampling frequency, $f_s$, is the de-chirped radar signal sampling frequency. For simplicity, assume that the symbol length is a positive integer multiple of the pulse repetition interval (PRI).

By modeling the vibrating surface as a linear time-invariant system, the vibrational displacement is $$d(t)=\sum_{q=1}^{Q} d_q(t-(q-1)T_{sym}) \quad (14)$$

where $$d_q(t)=\sum_{n=0}^{q-1} x_{q-n}(t-nT_{sym}) \otimes h(t) \quad (15)$$

for $0 \le t < T_{sym}$ and 0 otherwise. The symbol ⊗ is the convolution operation and h(t) is the surface's impulse response. In practice, an accurate estimate of h(t) is helpful to use the maximum likelihood detection methods described herein. The set of possible displacements for a single symbol interval is described as $\mathcal{D}=\{d^{(1)}(t), d^{(2)}(t), \ldots, d^{(D)}(t)\}$. Note that $D \ne M$ if the convolution resulting in displacement gives different displacement results during intervals of the same excitation symbol due to previous symbol contributions causing intersymbol interference (ISI).

By substituting equation 14 into 5 which is then used in 12, the VRBC channel can be described by the excitation/message for a given transponder range and trajectory ($r_{tar}$, $v_{tar}$, and $v_{radar}$). To highlight that the target-derived component of the signal $y_{tar}(t)$ is a function of d(t), the equation $$y(t)=\sum_{q=1}^{Q} y_q(t-(q-1)T_{sym}) \quad (16)$$

where $$y_q(t)=y_{q,tar}(d_q(t))+\tilde{\eta}(t) \quad (17)$$

and $y_{q,tar}(d_q(t))=y_{tar}(t)$ for $(q-1)0 \le t < qT_{sym}$ and 0 elsewhere. The target-derived component, $$y_{q,tar}^{(i)}(t)$$

takes on a finite number of realizations described by the set $$\mathcal{Y}_q=\{y_{q,tar}^{(1)}(t), y_{q,tar}^{(2)}(t), \ldots, y_{q,tar}^{(D)}(t)\},$$

which directly relate to the displacement of the VRBC transponder, $$y_{q,tar}^{(i)}(t)=y_{tar}(t) \text{ given } d(t)=d^{(i)}(t).$$

The set $\mathcal{Y}_q$ does differ per symbol interval q, if the target is moving relative to the radar. The cardinality of the set for all q remains constant, however, due to the number of possible displacements being unaffected by relative transponder motion. If the transponder is not moving relative to the radar, then $\mathcal{Y}_q$ is the same for all q.

The method 200 further includes decoding (210) a predicted symbol sequence based on the encoded communication message sequence. In sets $\mathcal{D}$ and $\mathcal{Y}_q$, their cardinality D once again refers to the number of possible displacements and possible target-derived signal components. These sets are generated by considering the transponder's range, trajectory, impulse response, and phase to be known parameters that appear in our model as described above. In some cases, an assumption can be made that these parameters are estimated well and the primary task of putting the return into a Markov model consists of accounting for surface resonant effects and message coding constraints. To do so, symbol to symbol dependencies of a VRBC transponder can be considered.

Any real vibrational surface has a nontrivial, causal, and stable impulse response h(t). Previous symbol excitations will therefore contribute to the displacement observed during a given symbol interval, $(q-1)T_{sym} \le t < qT_{sym}$ for symbol index $q \ge 0$. This undesirable characteristic results in intersymbol interference (ISI). In mitigating ISI, it is common to make use of line coding constraints that avoid error-prone patterns from occurring in a message sequence. Both ISI and coding constraints present themselves in the form of previous symbol interval dependencies from the perspective of the current symbol interval. Though it results in ISI, resonant surfaces can be favorable in that they often lead to larger maximum displacements, which puts more of the power due to vibrations existing at frequencies outside of 0 Hz Doppler.

In general, the observed vibrational displacement for the $q^{th}$ symbol interval can be estimated using the interference from a finite number of previous symbols rather all the previous symbols as described in equation 15. Let $$d_q(t) = \sum_{n=0}^{N_q} x_{q-n}(t - nT_{sym}) \otimes h(t) \quad (18)$$

for $0 \le t < T_{sym}$ and 0 otherwise. Here, $N_q$ is the number of symbols previous whose vibrational transients interfere with the current symbol's vibrational displacement. This model assumes that for the $q^{th}$ symbol interval that all vibrations due to symbols prior to the $(q-N_q)^{th}$ symbol have decayed to a negligible amount.

Picking $N_q$ is not required to be done in a particular way. In some cases, picking $N_q$ does always require considering the full resonant displacements of each symbol excitation, $x^{(m)}(t) \otimes h(t)$, and implementing some constraint on what defines a negligible amount of displacement. In some cases, a negligible amount of interfering displacement is defined as displacement with a magnitude less than a chosen ratio of the maximum absolute displacement provided by any of the M symbol excitations.

This ratio is labeled as $\gamma_{min}$. In some cases, $\gamma_{min}$ is permitted to dictate a different number of symbol intervals for which it takes each of the M symbol excitations to decay out to the negligible amount. The set $\mathcal{N}$ is used to describe the system's symbol-specific resonances, $\mathcal{N} = \{N^{(1)}, N^{(2)}, \ldots, N^{(M)}\}$, where element $N^{(m)}$ describes the number of symbol intervals it takes the $m^{th}$ symbol to decay to $\gamma_{min} \max_{t,m}(d^{(m)}(t))$.

The choice in $\gamma_{min}$ does affect detection performance. If $\gamma_{min}$ is too large, then detection performance degrades as the interference present becomes inaccurately represented. Alternatively, choosing a smaller $\gamma_{min}$ will create a more accurate representation but will also increase the model complexity and eventually provide no additional performance benefits in sequence detection over single symbol detection.

In a Markov model, states and transition events are used to describe how a sequence of observations depend on previous observations. In some cases, the method 200 further includes inputting the encoded communication message sequence into a Markov model. In VRBC, ISI and coding constraints can dictate the possible observations a given symbol interval may include. Let $$d_q(t) - (x_q(t) \otimes h(t)) \in \mathcal{D}_{ISI} \quad (19)$$

define the ISI of the $q^{th}$ symbol interval, where DISI is the set of possible ISI displacements and which has a cardinality we denote as S to stand for the number of VRBC states. The set of possible ISI conditions/states can be found by considering all symbol sequence permutations of the M symbols of length $\max(\mathcal{N})$ or less. Coding constraints and a non-uniform $\mathcal{N}$ can lead to certain permutations being unachievable or unnecessary to define distinctly.

$y_q(t)$ can be considered independent of $y_{q-i}(t)$ given $y_{q-i}(t)$ for $i > 1$ since no interval's displacement can be dependent on more than the previous when the previous is defined on ISI that is only further decaying out and remaining negligible in the current interval. Transition events for a VRBC Markov model are then described by the symbol excitation of the current interval, as it is these new symbols that define what the ISI will look like in the next symbol interval. In other words, these new symbols define the transitioning state of the ISI.

It may be insufficient to describe states and transition events alone. Transition probabilities must also be fully described in order for detection to benefit from this model.

Transition probabilities can be found using knowledge of our state definitions and any line coding constraints. Once defined, transition probabilities can be described in a state transition matrix A, within which element $A_{i,j}$ describes the probability of transitioning from state i to state j.

Using the notation that $m_q$ and $s_q$ are the $q^{th}$ symbol and state in a VRBC sequence where $m_q \in 1, 2, \ldots, M$ and $s_q \in 1, 2, \ldots, S$, the Markov model description can be summarized as: states (defined by the ISI present within a symbol interval), transition event (defined by an new symbol in a sequence), Markov property ($\Pr(s_q | s_1, s_2, \ldots, s_{q-1}) = \Pr(s_q | s_{q-1})$), and transition matrix ($A_{i,j} = \Pr(s_q = j | s_{q-1} = i)$).

Figure 4:
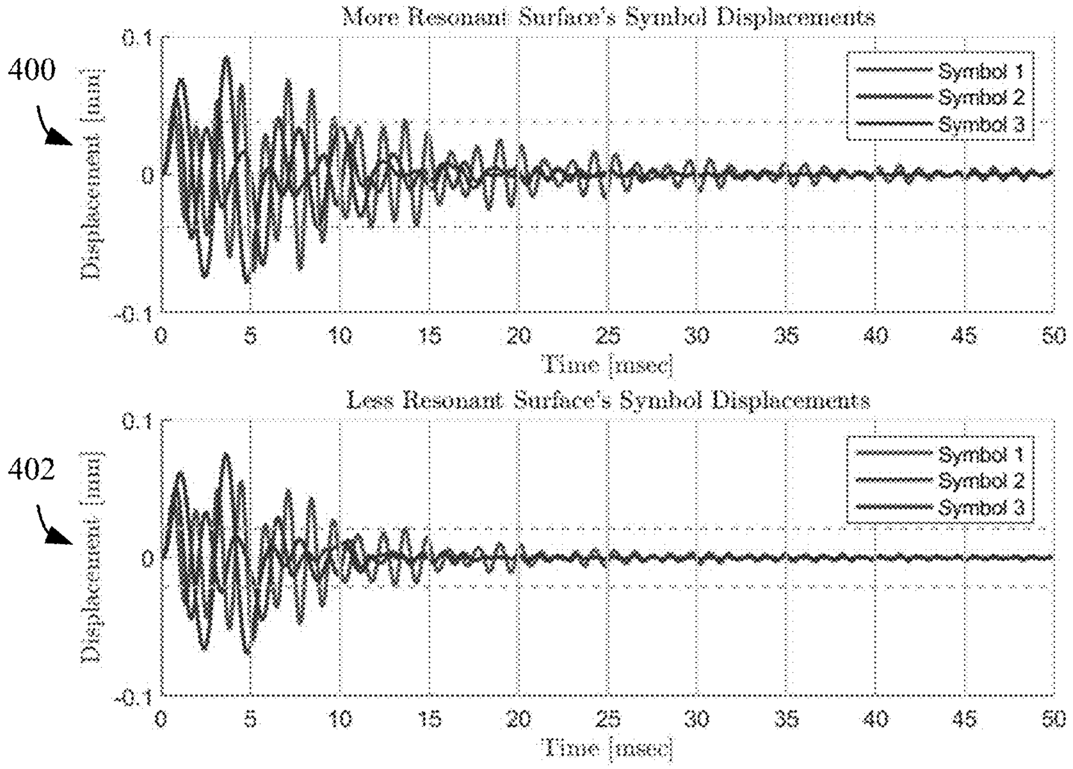
FIG. 4 illustrates displacement on two surfaces having differing levels of resonance.

FIG. 4 illustrates displacement on two surfaces having differing levels of resonance. The examples illustrate transition probabilities with resonant and non-resonant surfaces.

Example 1: Non-Resonant Surface Case: Consider M=3 excitation symbols chosen such that ISI is eliminated. One way in which the no-ISI case could be realized is by designing each symbol to have non-zero excitation for some smaller fraction of the full symbol length. This would allow the vibrational surface to return to equilibrium before the next symbol interval begins. Therefore $\mathcal{N} = \{0, 0, \ldots, 0\}$ and the displacement for a single symbol interval reduces to $$d_q(t) = x_q(t) \otimes h(t), \text{ for } 0 \le t < T_{sym} \quad (20)$$

In this example, it is assumed that no line coding is used as it would serve no purpose since there is no ISI. This scenario would therefore result in a single state.

The "_" symbol notation is used to indicate a symbol interval in which the excitation at this interval does not contribute to the current symbol interval's displacement.

Because there is no line coding, we construct the transition matrix assuming equiprobable symbols. For this example, the transition matrix is simply A=[1].

TABLE I

| States for M = 3 and $\mathcal{N}$ = {0, 0, 0} | |
|---|---|
| State Index | Sequences |
| 1 | |

Example 2: Resonant Surface Case: Now consider an alternative M=3 case. In this example, assume that all symbols produce non-negligible amounts of ISI for at least one symbol interval, $\min(\mathcal{N}) \ge 1$. Specifically, $\mathcal{N} = \{2, 1, 1\}$ is used. Consequently, adoption of a simple coding constraint is used in which consecutive symbols are not possible, $m_q \ne m_{q-1}$, as to attempt to mitigate the errors caused by previous symbol ISI. Furthermore, consider any symbol interval to have equally probable chances of being any of the M symbols besides for whatever the previous symbol was, $$Pr(m_q = m) = \frac{1}{M-1}$$

for all $m \ne m_{q-1}$.

When no coding scheme is invoked, the possible states are described by the full list of possible sequences of the M symbols that are of length $\max(\mathcal{N})$ or less. These sequences are described in the rows of Table II. The sequences in the table are formatted such that reading the symbol sequences left to right goes from the most previous contributing symbol interval's excitation to the most recent symbol interval's excitation, i.e. the $(q-\max(\mathcal{N}))^{th}$ to the $(q-1)^{th}$ symbol interval.

TABLE II

| States for M = 3 and $\mathcal{N}$ = {2, 1, 1} | |
|---|---|
| State Index | Sequences |
| 1 | _ _ |
| 2 | _ 1 |
| 3 | _ 2 |
| 4 | _ 3 |
| | 1 1 |
| 5 | 1 2 |
| 6 | 1 3 |
| | 2 1 → _ 1 |
| | 2 2 → _ 2 |
| | 2 3 → _ 3 |
| | 3 1 → _ 1 |
| | 3 2 → _ 2 |
| | 3 3 → _ 3 |

After all possible states are generated, instances in which symbol excitations would no longer contribute ISI to the current symbol interval's displacement were replaced with the no-contribution symbol, often leading to duplicates of an existing state allowing for a state elimination. This replacement is shown via the "→-" in Table II. For example, the sequences of "2 1" became "_1" because $N^{(2)}=1$ and therefore would not contribute ISI in the q–$2^{th}$ position. Lastly, using our basic coding scheme of avoiding consecutive symbols requires that states violating this constraint be eliminated. The sequence of "1 1" exemplifies this. The states that remain in the M=3 and $\mathcal{N}$ ={2, 1, 1} example are those indexed in Table II.

For this example, the transition matrix is $$A=\begin{bmatrix} 0 & \frac{1}{3} & \frac{1}{3} & \frac{1}{3} & 0 & 0 \\ 0 & 0 & 0 & 0 & \frac{1}{2} & \frac{1}{2} \\ 0 & \frac{1}{2} & 0 & \frac{1}{2} & 0 & 0 \\ 0 & \frac{1}{2} & \frac{1}{2} & 0 & 0 & 0 \\ 0 & \frac{1}{2} & 0 & \frac{1}{2} & 0 & 0 \\ 0 & \frac{1}{2} & \frac{1}{2} & 0 & 0 & 0 \end{bmatrix} \tag{21}$$

when a coding scheme constraining consecutive symbols is implemented and all remaining symbols are equiprobable. As this matrix shows, the beginning state of no-ISI is unachievable at any point in the sequence besides for the start, since this example assumed all symbols produce non-negligible amounts of ISI for at least one symbol interval. Also illustrated is that states 5 and 6 are the only two that require considering more than the previous symbol in the sequence and can only be reached via a state where '1' was the previous symbol, (e.g., state 2).

Once put into a Markov model, VRBC detection can be completed using either single symbol or sequence maximum likelihood detection methods. At a top level, VRBC has the following progression from symbol input to symbol prediction, Input Symbol Channel Output Signal Detection Predicted Symbol $$m_q \rightarrow y_q \rightarrow \hat{m}_q \tag{22}$$

where predicted symbols are denoted as $\hat{m}$. Similarly, $\hat{s}$ will denote predicted states moving forward. The components of the symbol interval return signals $y_q(t)$ can then be placed into vector form. $y_q$ is used to denote the full $L_{sym}\times 1$ column vector of signal samples from the $q^{th}$ symbol interval, $a_q$ to denote the target-derived component, and $\eta_q$ contains the AWGN samples, $$y_q=a_q+\eta_q \tag{23}$$

Let the possible target-derived data vectors be specified using the notation $a^{(s,m)}$, indicating the results from ISI displacement associated with state s and current symbol displacement associated with the $m^{th}$ symbol.

In some cases, decoding (210) the predicted symbol sequence based on the encoded communication message sequence includes modeling a known set of symbols and characteristics of the vibrating transponder (e.g., characteristics that are known or estimated as described herein, such as resonance) and comparing (e.g., a model of an expected communication message sequence derived from the known set of symbols and the characteristics of the vibrating transponder) against the encoded communication message sequence. In some cases, decoding the predicted symbol sequence based on the encoded communication message sequence further includes employing message coding constraints on the encoded communication message sequence, defining possible message sequences based on a Markov model (e.g., by inputting the coding constrained encoded communication message sequence into a Markov model), and using a Viterbi algorithm to mitigate inter-symbol interference errors caused by vibrating surface resonant effects (e.g., of the vibrating transponder).

The method 200 further includes identifying (212), from one or more predetermined messages, an actionable message from the predicted symbol sequence and communicating (214) an actionable message to a display of a vehicle or causing the vehicle to take an action. For example, an actionable message may be communicated (214) to a display of a vehicle or cause the vehicle to take an action as described with respect to FIG. 1.

The actionable messages can be identified (212) by comparing and/or matching (e.g., within a predetermined probability) the predicted symbol sequence with predetermined messages that correspond to symbol sequences that are prestored in storage of the VRBC system. For example, referring back to FIG. 1, the vehicle 100 having the VRBC system can compare and/or match the predicted symbol sequence indicates that vehicle 124 is braking or disabled to a predetermined message to communicate to a display of the vehicle 100 that indicates the vehicle 124 is braking or disabled and/or cause the vehicle 100 to decelerate appropriately with respect to the vehicle 124 and/or to cause the driver assistance system and/or autonomous driving system of the vehicle 100 to switch lanes (e.g., in the case that roadway 122 has an open lane). In some cases, other variables (e.g., the distance between the vehicle 100 and the vehicle 124) can be utilized to determine the most appropriate action to be taken (e.g., cause the vehicle 100 to decelerate appropriately with respect to the vehicle 124 or to cause the driver assistance system and/or autonomous driving system of the vehicle 100 to switch lanes).

In some cases (e.g., in which there are more than one vibrating transponders reflecting vibrational backscatter of the radar waveforms that is received by the VRBC system), the method 200 further includes receiving (e.g., similar to the receiving 204 step), from one or more second vibrating transponders, one or more second vibrational backscatter of the radar waveforms, determining a second angle and range of the one or more second vibrating transponders from the one or more second vibrational backscatter of the radar waveforms, isolating the vibrational backscatter from the vibrating transponder based on the determined angle and range of the vibrating transponder and isolating the one or more second vibrational backscatter from the one or more second vibrating transponders based on the angle and range of the one or more second vibrating transponders, performing (e.g., similar to the performing 208 step) synchronization on the one or more second vibrational backscatter to determine a second start of a second encoded communication message sequence, decoding (e.g., similar to the decoding 210 step) a second predicted symbol sequence based on the second encoded communication message sequence, identifying, (e.g., similar to the identifying 212 step) from the one or more predetermined messages, a second actionable message from the second predicted symbol sequence, and communicating (e.g., similar to the communicating 214 step) the second actionable message to a display of a vehicle or causing the vehicle to take an action.

Referring back to the decoding (210) step, single symbol maximum likelihood detection in AWGN is performed using $$\hat{m}_q = \underset{m}{\operatorname{argmax}} Pr(m_q = m) e^{-\left(y_q - a^{(\hat{s}_q, m)}\right)^H \Gamma^{-1}\left(y_q - a^{(\hat{s}_q, m)}\right)} \tag{24}$$

where $\Gamma$ is the noise covariance matrix. To perform sequence estimation, which we do via the Viterbi algorithm, we define the posterior probabilities, $Pr(s_q=s|y_q)$ using Bayes' theorem, $$Pr(s_q = s \mid y_q) = \frac{f(y_q \mid s_q = s) Pr(s_q = s)}{f(y_q)} = \frac{l_s(y_q)}{\sum_{t=1}^{S} l_t(y_q)} \tag{25}$$

where $$l_s(y_q) = \sum_{m \in \mathcal{M}^{(s)}} \frac{Pr(s_q = s)}{|\mathcal{M}^{(s)}|} e^{-\left(y_q - a^{(\hat{s}_q, m)}\right)^H \Gamma^{-1}\left(y_q - a^{(\hat{s}_q, m)}\right)} \tag{26}$$

and $\mathcal{M}^{(s)}$ is the set of possible current symbols that can occur when in state s.

Equation 25 can be found by acknowledging that given a particular state, the output vector has a complex multivariate Gaussian mixture probability density function of, $$f(y_q \mid s_q = s) = \sum_{m \in \mathcal{M}^{(s)}} \frac{1}{|\mathcal{M}^{(s)}|} \tilde{\mathcal{N}}\left(a^{(s,m)}, \Gamma\right) \tag{27}$$

for a single channel use. If the input state is not known, the distribution of the output data vector is the weighted sum of those state-conditioned densities, $$f(y_q) = \sum_{s=1}^{S} Pr(s_q = s) f(y_q \mid s_q = s) \tag{28}$$

The probability of being in a state during a particular symbol interval, $Pr(s_q=s)$, can be found recursively using the state transition matrix, $$\pi_q = \pi_{q-1} A \tag{29}$$

where $\pi_q$ is the column vector describing the probabilities of each state occurring at the $q^{th}$ symbol interval, for example $\pi_q=[Pr(s_q=1), Pr(s_q=2), \ldots Pr(s_q=S)]^T$. Naturally, $\pi_0=[1, 0, 0, \ldots, 0]^T$ in all cases assuming the first state is always defined as the state where no previous or current symbol excitations contribute to displacement.

In carrying out the Viterbi algorithm, two matrices can be calculated for each symbol interval and state combination. These calculations fully describe the standard Viterbi trellis. Define the S×Q matrices $$T_1[s, q] = \max_t (T_1[t, q-1] A_{t,s} Pr(s_q = s \mid y_q)) \tag{30}$$

and $$T_2[s, q] = \underset{t}{\operatorname{argmax}} (T_1[t, q-1] A_{t,s} Pr(s_q = s \mid y_q)) \tag{31}$$

$T_1$ tracks the probability associated with the most likely path leading to the current symbol interval's state being state s. $T_2$ tracks the previous symbol interval's state prediction associated with the most likely path leading to the current symbol interval's state being state s.

To decide the final sequence observed, the last state detected can be found by considering $\operatorname{argmax}_t(T_1[t,Q])$. Once the sequence of states is found by recursively considering $\hat{s}_q=T_2[\hat{s}_{q+1},q+1]$, the predicted symbol sequence can be found by considering what transition events led (or could have led) to the sequence of predicted states. The phrase "could have led" alludes to the case where $\min(\mathcal{N})<1$. In these cases, single symbol maximum likelihood detection is needed to decide between multiple potential transition events. This is most easily understood by observing that sequence detection for the non-resonant surface example we provide would result in a predicted state sequence that is trivial and yields no information on symbol detection. In this specific case, single symbol detection is used to decide between all M symbols, though cases where only some values in $\mathcal{N}<1$ will benefit from using sequence detection followed by single symbol detection when non-unique state transitions occur.

Calculation of the Communication Rate

Once the predicted symbol sequence is found, an estimate of the achieved communication rate is calculable using the errors between the true and predicted symbol sequences, $m=[m_1, m_2, \ldots m_Q]^T$ and $\hat{m}=[\hat{m}_1, \hat{m}_2, \ldots \hat{m}_Q]^T$. The observed mutual information rate is given by $$R_{obs} = \frac{H(\hat{m}_q) - H(\hat{m}_q \mid m_q)}{T_{sym}} \tag{32}$$

where $H(\cdot)$ indicates entropy. Consider a confusion matrix, C, describing the errors observed. $C_{m,n}$ describes the number of times the $m^{th}$ symbol was predicted to be the $n^{th}$ symbol. Components of equation 32 are then $$H(\hat{m}_q) = -\sum_n \left(\frac{\sum_m C_{m,n}}{Q}\right) \log_2 \left(\frac{\sum_m C_{m,n}}{Q}\right) \tag{33}$$

-continued and $$H(\hat{m}_q \mid m_q) = -\sum_m \left( \frac{\sum_n C_{m,n}}{Q} \right) H(\hat{m}_q \mid m_q = m) \tag{34}$$

where $$H(\hat{m}_q \mid m_q = m) = -\sum_n \left( \frac{C_{m,n}}{\sum_n C_{m,n}} \right) \log_2 \left( \frac{C_{m,n}}{\sum_n C_{m,n}} \right) \tag{35}$$

Calculation of an Upper Bound of the Communication Rate for a Given Set of Symbols and Vibrating Transponder Using our knowledge of the symbol vector distributions, this achieved rate can be compared to a theoretical upper bound.

To declare an upper bound on the possible communications rate, the data processing inequality can first be used on the mutual information used in defining the mutual information rate $$\mathcal{I}(m_q;\hat{m}_q) \le \mathcal{I}(m_q;y_q) \tag{36}$$

Therefore, $$R \le \frac{\mathcal{I}(m_q; y_q)}{T_{sym}} = \frac{h(y_q) - h(y_q \mid m_q)}{T_{sym}} \tag{37}$$

where h(·) now indicates differential entropy.

The differential entropy of the output signal data vector is $$h(y_q) = -\int f(y_q) \log_2 f(y_q) dy_q \tag{38}$$

Recall that equation 28 shows that the distribution of the output data vector is a homoscedastic (same covariance) complex multivariate Gaussian mixture. Unfortunately, there is no analytical solution to the differential entropy of a complex multivariate Gaussian homoscedastic mixture. An upper bound on this differential entropy is found by using the lower bound for the expected value of log-sum. The resultant differential entropy is $$h(y_q) \le -\sum_{s=1}^{S} \sum_{m \in \mathcal{M}^{(s)}} \pi_{s,m} \log_2(\zeta_{s,m}) = h(y_q \mid s_q, m_q) \tag{39}$$

where $$\zeta_{s,m} = \sum\nolimits_{s'=1}^{s} \Sigma_{m' \in \mathcal{M}^{(s')}} \pi_{s',m'} 2^{-\beta_{ms,m's'}}$$

$$\beta_{m,s,m',s'} = (a^{(s,m)} - a^{(s',m')})^H \Gamma^{-1} (a^{(s,m)} - a^{(s',m')})$$

and shorthand $$\pi_{s,m} = \Pr(s_q = s, m_q = m).$$

Proof: The inequality used in proving this upper bound on differential entropy is the lower bound on the expected value of a log-sum, $\mathbb{E}_g[\log_2 \Sigma_k f(x_k)] \ge \log_2 \Sigma_k 2^{\mathbb{E}_g[\log_2 f(x_k)]}$.

Note that the distribution of $y_q$ can be considered a single Gaussian mixture even though it is distinctly written as a mixture of mixtures. Let W and w represent the set that the double summations span and variable that represents a state and current symbol combination respectively. The Kullback-Liebler (KL) distance between two homoscedastic complex multivariate Gaussians distributions can be written as $$KL(f(y_q \mid w_q = w) \| f(y_q \mid w_q = w')) = \beta_{w,w'}. \tag{40}$$

Using shorthand for a conditional distribution $f(y_q|w_q=w)$ as $f_w$, conditional differential entropy $h(y_q|w_q=w)$ as $h_w$, KL distance $KL(f(y_q|w_q=w)\|f(y_q|w_q=w'))$ as $KL(w\|w')$, and probability $\Pr(w_q=w)$ as $\pi_w$, $$\begin{aligned} h(y_q) &= -\int \sum_{w \in \mathcal{W}} \pi_w f_w \log_2 \left( \sum_{w' \in \mathcal{W}} \pi_{w'} f_{w'} \right) dy_q \\ &= -\sum_{w \in \mathcal{W}} \pi_w \mathbb{E}_{f_w} \left[ \log_2 \left( \sum_{w' \in \mathcal{W}} \pi_{w'} f_{w'} \right) \right] \\ &\le -\sum_{w \in \mathcal{W}} \pi_w \log_2 \left( \sum_{w' \in \mathcal{W}} 2^{\mathbb{E}_{f_w}[\log_2 \pi_{w'} f_{w'}]} \right) \\ &= -\sum_{w \in \mathcal{W}} \pi_w \log_2 \left( \sum_{w' \in \mathcal{W}} 2^{\int f_w \log_2 \frac{\pi_{w'} f_{w'} f_w}{f_w} dy_q} \right) \\ &= -\sum_{w \in \mathcal{W}} \pi_w \log_2 \left( \sum_{w' \in \mathcal{W}} \pi_{w'} 2^{-h_w} 2^{-KL(w\|w')} \right) \\ &= \sum_{w \in \mathcal{W}} \pi_w h_w - \sum_{w \in \mathcal{W}} \pi_w \log_2 \left( \sum_{w' \in \mathcal{W}} \pi_{w'} 2^{-\beta_{w,w'}} \right) \end{aligned} \tag{41}$$

Rewriting equation 41 without the shorthand notation gives equation 39.

Because $h(y_q|m_q) \ge h(y_q|s_q,m_q)$, substituting the bound on $h(y_q)$ into the equation for rate provides the upper bound $$R_{KL\ UB} = -\sum_{s=1}^{S} \sum_{m \in \mathcal{M}^{(s)}} \frac{\pi_{s,m}}{T_{sym}} \log_2(\zeta_{s,m}) \tag{42}$$

Alternatively, because the complex multivariate Gaussian mixture considered in bounding the differential entropy is homoscedastic, the basic upper bound reduces to the simple bound provided by the entropy of M-ary communications, $$R_{M\text{-}ary\ UB} = -\sum_{m=1}^{M} \frac{Pr(m_q = m)}{T_{sym}} \log_2 Pr(m_q = m) \tag{43}$$

As SNR increases, it is seen that the exponential in equation 42 goes to 0 and the bound on the rate increases to one which relates to M-ary communication if the number of state and current symbol combinations was equivalently the number of symbols. This will lead to a less tight bound than $R_{M\text{-}ary\ UB}$. For this reason, our full upper bound is written as $$R_{UB} = \min\{R_{KL\ UB}, R_{M\text{-}ary\ UB}\} \tag{44}$$

For all cases, higher SNR will lead to using the M-ary upper bound over the KL-derived bound, but at what SNR this occurs is entirely dependent on the excitations used and transponder impulse response. Regardless, once this M-ary upper bound is reached in VRBC, the only ways rate can be increased is by increasing the number of symbols used, decreasing the symbol length, or better balancing the probabilities of the different symbols if they are not already equiprobable, which may require better choices in the symbol excitations such that the multiple symbol data vectors are more orthogonal.

Simulation Result

The scenario in which M=3 is continued to demonstrate key discussion points of VRBC operation. We use a PRF=4 kHz, symbol length of $T_{sym}$=5 ms, ADC sampling frequency of 1 MHz, and therefore an $L_{sym}$=5000. An arbitrary single set of M=3 frequency shift-keying symbol excitations are considered. They consist each of a tone at 800, 600, and 400 Hz respectively.

Signal to noise ratio (SNR) is defined here as the ratio of the variance of the target return gain/attenuation term, $\tilde{\alpha}_{tar}$, to the variance of the AWGN noise, $$SNR = \frac{\mathbb{E}[|\tilde{\alpha}_{tar}|^2]}{\sigma_n^2} \tag{45}$$

As an example, consider a radar whose peak receiver gain is ≈48 dB and noise figure is ≈15 dB, keeping in mind that atmospheric loss≈0.2 dB/km, and considering a 6 in (0.15 m)×12 in (0.3 m) fully reflective license plate transponder surface, these SNRs relate to transponder range via $$SNR \approx \frac{(0.15^2)(0.3^2)}{(4\pi r_{obj}^2)^2} 10^{(13.4 - 0.00002 r_{obj})} \tag{46}$$

This relationship was calculated using equation 47 and recognizing that $\sigma_{obj}=4\pi h^2 w^2/\lambda^2$ for a fully reflective h×w plate. This means that, for this example radar/transponder scenario, SNRs of [−25, −20, −15, −10, −5, 0, 5, 10] dB correspond to ranges of [238, 179, 133, 100, 75] meters. Naturally, these are maximum SNRs assuming the rectangular transponder's surface is perfectly perpendicular to the radar's main beam. If instead of a license plate, a trihedral corner reflector was used to make the transponder's SNR less dependent on angular orientation, the same SNR could be achieved when the corner reflector's edge length, l, is approximately 0.28 m, $$\sigma_{obj} = \frac{4\pi l^4}{3\lambda^2}.$$

Monte Carlo results for the communication rate can be compared to the theoretical upper bound. The simulated experimental results include when the detection methods used are symbol maximum likelihood detection, and the Viterbi algorithm on the states, as illustrated in FIGS. 5 and 6. 100 iterations of 50-length sequences were used at each SNR for Monte Carlo results.

Choosing a Detection Method Based on a Transponder's Level of Resonance

FIG. 4 illustrates the symbol displacements on two surfaces over multiple symbol intervals. Two impulse responses 400, 402 consisting of a sum of decaying sinusoids at resonant frequencies measured from two aluminum plates. The impulse responses 400, 402 differ only in the decay factor of the various resonant frequencies to demonstrate the importance of recognizing the degree of resonance present in a VRBC surface of interest (e.g., a surface of a vibrating transponder) when choosing what detection method should be used. The first impulse response 400 corresponds to the surface that is more resonant and therefore contains the most ISI. The second impulse response 402 is less resonant. Due to the variation in resonances, $\gamma_{min}$ is adjusted to $\mathcal{N}$ ={2, 1, 1} for both cases. This allows the comparison between these two cases to highlight when sequence versus symbol detection is preferable.

Figure 5:
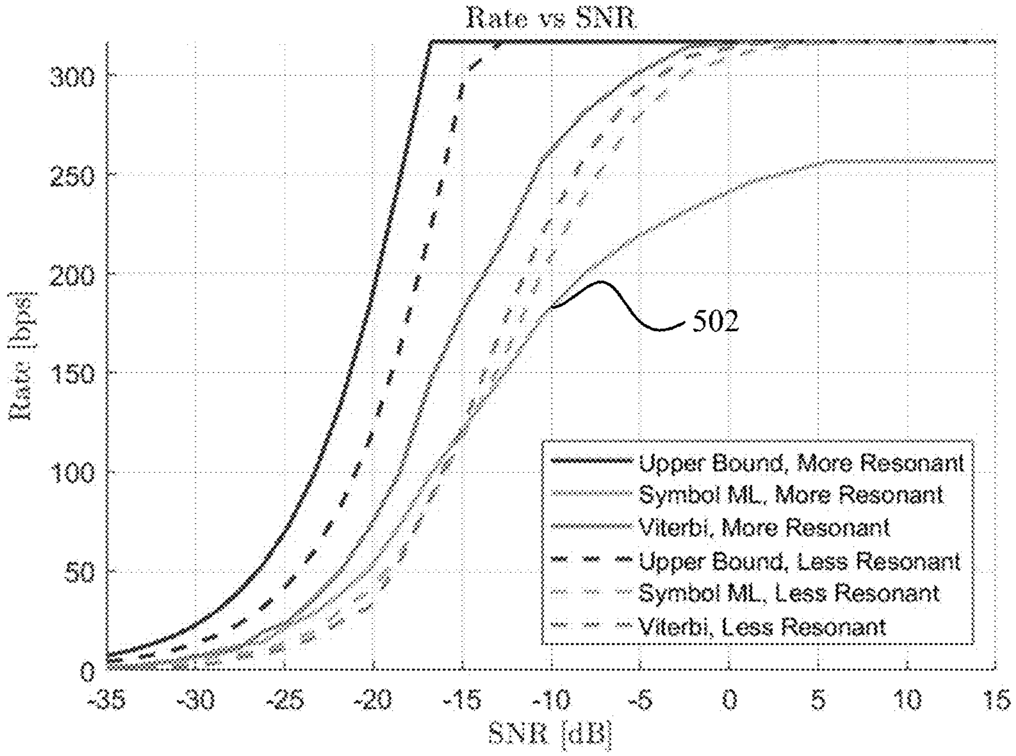
FIG. 5 illustrates a graph of communication rate vs. signal to noise ratio using different methods for a first given set of variables.
Figure 6:
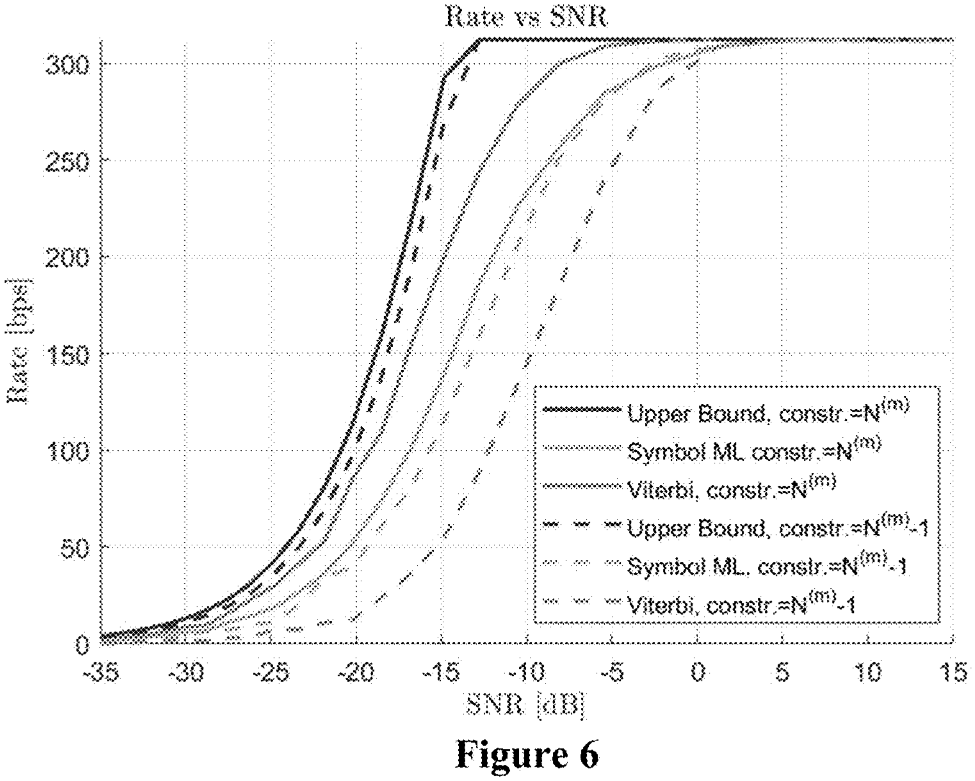
FIG. 6 illustrates a graph of communication rate vs. signal to noise ratio using different methods for a second given set of variables.

FIG. 5 illustrates a graph of communication rate vs. signal to noise ratio using different methods for a first given set of variables. For the more resonant surface, a $\gamma_{min}$=0.45 is used (solid line plots). In other words, the requirement for considering ISI negligible is relatively relaxed. For the second case, $\gamma_{min}$=0.45 (dashed line plots). A non-consecutive symbol message constraint is used for both cases. FIG. 5 shows the surfaces' resultant communication rates.

These two examples demonstrate that the added complexity of implementing sequence detection does not always lead to a significant increase in performance. As illustrated in FIG. 5, when the vibrating transponder is more resonant, the Viterbi algorithm does prove to increase the rate achieved significantly. FIG. 5 also illustrates that sequence detection can provide a slight increase in performance for a less resonant transponder. As described above, sequence detection comes at the cost of additional modeling and computational power, which may in turn make sequence detection undesirable for less resonant surfaces. Though not illustrated, it is possible to inaccurately model ISI. For example, setting $\gamma_{min}$ such that one symbol barely requires an additional interval to decay and the others barely do not. Doing so can lead to worse sequence detection performance as it results in invoking inaccurate symbol interval dependencies. For this reason, cases where ISI modeling utilizes a significant $\gamma_{min}$ (e.g., greater than about 0.1), and/or symbol displacements that do not provide borderline ISI requirements can be selected. For example, borderline ISI requirements include a situation where vibrational backscatter of a first symbol from a vibrating transponder would barely pass as not interfering enough to need to be modeled and vibrating backscatter from a second symbol from the vibrating transponder would barely pass as interfering enough to need to be modeled. Modeling on the vibrational backscatter of the second symbol from the vibrating transponder and not the vibrational backscatter of the first symbol from the vibrating transponder poses problems because the first and second symbol decay out similarly but the choice in modeling treats the two symbols very differently.

FIG. 5 also illustrates that that ISI can cause the M-ary upper bound to be unachievable by any of the described detection methods. Though a case for single symbol detection not achieving the upper bound is illustrated, the same reasoning could apply to sequence detection if ISI is inaccurately modeled. For the more resonant surface's single symbol detection results, ISI is so great that certain sequences will always result in incorrect detections even when there is no noise present, as illustrated by plot 502. These cases can be understood by considering when a previous symbol provides larger enough interference that it will mask the current symbol. In trying to design VRBC systems that achieve the M-ary upper bound at high SNRs, symbol-specific data vectors must be made orthogonal and have similar decay rates.

Choosing a Detection Method Based on Imposed Communication Message Constraints FIG. 6 illustrates a graph of communication rate vs. signal to noise ratio using different methods for a second given set of variables. Specifically, FIG. 6 illustrates the results for two coding constraints that are based on the resonances of the VRBC transponder. FIGS. 4 and 5 illustrate the non-consecutive symbol constraint. To align a coding constraint with the characteristics of the system, consider the less resonant surface of FIGS. 4 and 5 where $\mathcal{N}=\{2, 1, 1\}$. Referring to FIG. 6, symbols are required to be separated in accordance with N. In other words, consecutive m-symbols must have at least $N^{(m)}$ intervals between them (solid line plots). Another case illustrated in FIG. 6 consider allow for $N^{(m)}-1$ intervals between consecutive symbols (dashed line plots). Simulating a coding constraint that is more restrictive than $\mathcal{N}$, such as requiring $N^{(m)}+1$ intervals between consecutive symbols, is not possible in this case. It would lead to the set of available symbols at certain intervals being empty due to the need for previous symbols to decay further before reuse.

When choosing a VRBC system to achieve larger communication rates, coding constraints and ISI modeling should both be considered as described above. This is illustrated in FIG. 6 for the $N^{(m)}$ constraint used in combination with sequence detection. FIG. 5 illustrates that modeling ISI higher than what the coding constraint can handle (e.g., like in the $N^{(m)}-1$ constraint illustrated in FIG. 6), single symbol detection can become a better choice for detection. To achieve rates closer to the upper bound in VRBC, aligning line coding constraints with the resonances of the surface in order to benefit most from sequence detection is advantageous.

With respect to other variables, a larger M provides higher communication rates so long as the M symbol's resultant data vectors remain distinguishable (e.g., closer to orthogonal). A higher PRF allows for the symbol duration, $T_{sym}$, to decrease, thus increasing communication rates so long as it does not lead to a case where ISI becomes overly consequential. Choices in symbol excitation can also provide higher communication rates when data vectors, $a_q$, that are closer to orthogonal. Orthogonality of data vectors not only depend on signal excitation but also the choice in clutter filtering methods.

The Markov modeling framework described above allows VRBC symbol intervals to take on states that are defined by any ISI present. The described symbol excitation then serves as the transitional event from one state to another. This framework serves only to allow sequence detection to better improve performance when resonant surfaces are used in VRBC. Useful upper bound on communication rates that take into consideration the ISI of the VRBC system is also described above.

For application in anything-to-vehicle communications, the additional consideration of background vibrations (e.g., caused by a vehicle) can also be considered. VRBC displacement frequencies need to be distinctly recognizable in the presence of such noise. Either prior automotive noise knowledge or real-time noise estimation methods can be utilized to design VRBC symbols to provide sufficient SNR in Doppler. This along with vibrating transponder design can allow for a larger number of symbols (e.g., larger M).

Figure 7:
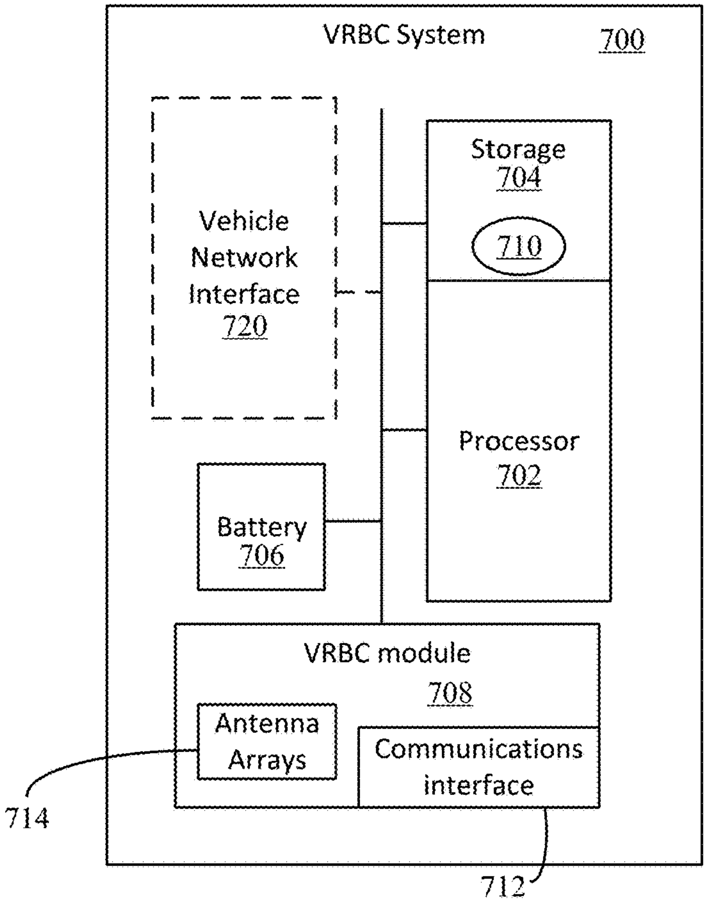
FIG. 7 illustrates a VRBC system.

FIG. 7 illustrates a VRBC system. Referring to FIG. 7, a VRBC system 700 can include a processor 702, storage 704, a battery 706 (or electrical connection to a vehicle's battery system), and a VRBC chip 708. Instructions 710 can be stored in the storage 704 that when executed by the processor 702 direct the VRBC system 700 to perform various processes supporting frictionless transactions such as described above (e.g., method 200).

The VRBC chip 708 includes VRBC hardware (e.g., a VRBC device) providing at least a communications interface 712 and antenna arrays 714 for long distance spatial positioning. A devoted memory and processor can be included as part of the VRBC chip 708 or as components connected to the VRBC chip 708 (e.g., as illustrated in FIG. 7). Accordingly, a VRBC chip 708 may include circuitry, a transceiver, an antenna (its own or shared with a vehicle's driver assistance systems and/or autonomous driving systems) and storage. The VRBC chip 708 operates by sending pulses at mmW frequencies (e.g., 1 millimeter to 1 centimeter). A corresponding receiver is able to translate the pulses into data based on pulse sequences. For example, time of flight measurements may be taken between sending a pulse and receiving vibrational backscatter to calculate distance.

In some cases, the VRBC chip 708 is a Texas Instrument's IWR1443BOOST. This chip is included in automotive and industrial mmW radars. This chip operates at standard mmW automotive radar frequency band at 77 GHz with up to 4 GHz of continuous bandwidth. This chip utilizes a frequency modulated continuous wave waveform. This chip includes onboard printed circuit board antenna arrays (e.g., 4 elements of receiving and 3 elements for transmission of mmW radar waveforms) with a 3 dB-beamwidth of approximately ±28 degrees in azimuth and ±14 degrees in elevation and 12 dBm of transmit power as a complementary metal-oxide semiconductor chip design.

The processor 702 can include any suitable processing devices, such as a microprocessor, central processing unit (CPU), graphics processing unit (GPU), field programmable gate arrays (FPGAs), application-specific integrated circuits (ASICs), logic circuits, and state machines.

The storage 704 can include volatile (e.g., dynamic random-access memory (DRAM), static random-access memory (SRAM)) and non-volatile memory (e.g., flash, magnetic random access memory (MRAM, FeRAM)). Non-volatile memory can be used as persistent memory since non-volatile memory does not require power to maintain the stored information. The memory of storage 704 may be removable or non-removable.

In some cases, the VRBC system 700 can further include a network interface 720 to communicate with a display of a vehicle or with the vehicle's driver assistance systems and/or autonomous driving systems as well as other components found in internet of things (IOT) devices (e.g., speakers, vehicles, appliances, and any other article of manufacture that has a computing device with network capabilities). Network interface 720 may include the interfaces and logic for communicating over various networks such as via short range wireless connectivity (e.g., near field communication (NFC)), via radio frequency protocols (e.g., Bluetooth, Wi-Fi using IEEE standards 802.11, cellular data protocols using GSM, CDMA, 3G, 4G, 5G etc., satellite), and via wired connections (e.g., to a vehicle's systems). The particular types of communications available via network interface 720 depends on implementation.

Embodiments may be implemented as a computer process, a computing system, or as an article of manufacture, such as a computer program product or computer-readable medium. Certain methods and processes described herein can be embodied as software, code and/or data, which may be stored on one or more storage media. Certain embodiments of the invention contemplate the use of a machine in the form of a computer system within which a set of instructions, when executed, can cause the system to perform any one or more of the methodologies discussed above.

Certain computer program products may be one or more computer-readable storage media readable by a computer system (and executable by a processing system) and encoding a computer program of instructions for executing a computer process. It should be understood that as used herein, in no case do the terms “storage media”, “computer-readable storage media” or “computer-readable storage medium” consist of transitory carrier waves or propagating signals. Instead, “storage” media refers to non-transitory media.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A method comprising:

transmitting radar waveforms at millimeter wave frequencies;

receiving, from a vibrating transponder, vibrational backscatter of the radar waveforms;

determining an angle and range of the vibrating transponder from the vibrational backscatter of the radar waveforms;

performing synchronization on the vibrational backscatter of the radar waveforms to determine a start of an encoded communication message sequence;

decoding a predicted symbol sequence based on the encoded communication message sequence;

identifying, from one or more predetermined messages, an actionable message from the predicted symbol sequence; and communicating the actionable message to a display of a vehicle or causing the vehicle to take an action.

2. The method of claim 1, wherein the vibrational backscatter are a phase modulation of the radar waveforms.

3. The method of claim 1, further comprising:

receiving, from one or more second vibrating transponders, one or more second vibrational backscatter of the radar waveforms;

determining a second angle and range of the one or more second vibrating transponders from the one or more second vibrational backscatter of the radar waveforms;

isolating the vibrational backscatter from the vibrating transponder based on the determined angle and range of the vibrating transponder and isolating the one or more second vibrational backscatter from the one or more second vibrating transponders based on the angle and range of the one or more second vibrating transponders;

performing synchronization on the one or more second vibrational backscatter to determine a second start of a second encoded communication message sequence;

decoding a second predicted symbol sequence based on the second encoded communication message sequence;

identifying, from the one or more predetermined messages, a second actionable message from the second predicted symbol sequence; and communicating the second actionable message to the display of the vehicle or causing the vehicle to take a second action.

4. The method of claim 1, further comprising performing bandpass filtering on the vibrational backscatter of the radar waveforms to separate the vibrational backscatter from any other vibrational backscatter in range.

5. The method of claim 4, further comprising performing beamforming on the vibrational backscatter to separate the vibrational backscatter from any other vibrational backscatter in angle.

6. The method of claim 5, further comprising performing clutter filtering on the vibrational backscatter to separate the vibrational backscatter from backscatter of non-vibrating objects, wherein performing the synchronization on the vibrational backscatter comprises performing the synchronization on the clutter filtered vibrational backscatter to determine the start of the encoded communication message sequence.

7. The method of claim 1, wherein receiving, from the vibrating transponder, the vibrational backscatter of the radar waveforms comprises performing constant false alarm rate detection to detect the vibrational backscatter of the radar waveforms.

8. The method of claim 1, further comprising analyzing Doppler frequencies of the vibrational backscatter of the radar waveforms to determine that the vibrational backscatter of the radar waveforms include indications of displacements of the vibrating transponder at frequencies of interest.

9. The method of claim 1, wherein performing the synchronization on the vibrational backscatter of the radar waveforms to determine the start of the encoded message sequence comprises identifying a time index associated with a peak in a correlation or a peak in coherence between the vibrational backscatter and a known preamble to determine the start of the encoded communication message sequence.

10. The method of claim 1, wherein decoding the predicted symbol sequence based on the encoded communication message sequence comprises modeling a known set of symbols and characteristics of the vibrating transponder and comparing against the encoded communication message sequence.

11. The method of claim 10, wherein decoding the predicted symbol sequence based on the encoded communication message sequence further comprises:

employing message coding constraints on the encoded communication message sequence;

defining possible message sequences based on a Markov model; and using a Viterbi algorithm to mitigate inter-symbol interference errors caused by vibrating surface resonant effects.

12. A computing device comprising:

a processor, memory and instructions stored in the memory that when executed by the processor, direct the computing device to:

transmit radar waveforms at millimeter wave frequencies;

receive, from a vibrating transponder, vibrational backscatter of the radar waveforms;

determine an angle and range of the vibrating transponder from the vibrational backscatter of the radar waveforms;

perform synchronization on the vibrational backscatter of the radar waveforms to determine a start of an encoded communication message sequence;

decode a predicted symbol sequence based on the encoded communication message sequence;

identify, from one or more predetermined messages, an actionable message from the predicted symbol sequence; and communicate the actionable message to a display of a vehicle or causing the vehicle to take an action.

13. The computing device of claim 12, wherein the vibrational backscatter are a phase modulation of the radar waveforms.

14. The computing device of claim 12, wherein the instructions further direct the computing device to:

receive, from one or more second vibrating transponders, one or more second vibrational backscatter of the radar waveforms;

determine a second angle and range of the one or more second vibrating transponders from the one or more second vibrational backscatter of the radar waveforms;

isolate the vibrational backscatter from the vibrating transponder based on the determined angle and range of the vibrating transponder and isolating the one or more second vibrational backscatter from the one or more second vibrating transponders based on the angle and range of the one or more second vibrating transponders;

perform synchronization on the one or more second vibrational backscatter to determine a second start of a second encoded communication message sequence;

decode a second predicted symbol sequence based on the second vibrational radar backscatter communication message sequence;

identify, from the one or more predetermined messages, a second actionable message from the second predicted symbol sequence; and communicate the second actionable message to the display of the vehicle or causing the vehicle to take a second action.

15. The computing device of claim 12, wherein the instructions further direct the computing device to perform bandpass filtering on the vibrational backscatter to separate the vibrational backscatter from any other vibrational backscatter in range.

16. The computing device of claim 15, wherein the instructions further direct the computing device to perform beamforming on the vibrational backscatter to separate the vibrational backscatter from any other vibrational backscatter in angle.

17. The computing device of claim 16, wherein the instructions further direct the computing device to perform clutter filtering on the vibrational backscatter to separate the vibrational backscatter from backscatter of non-vibrating objects, wherein the instructions that direct the computing device to perform the synchronization on the vibrational backscatter comprise instructions that direct the computing device to perform the synchronization on the clutter filtered vibrational backscatter to determine the start of the encoded communication message sequence.

18. The computing device of claim 12, wherein the instructions that direct the computing device to decode the predicted symbol sequence based on the encoded communication message sequence further direct the computing device to model a known set of sources symbols and characteristics of the vibrating transponder against the encoded communication message sequence.

19. The computing device of claim 18, wherein the instructions that direct the computing device to decode the predicted symbol sequence based on the encoded communication message sequence further direct the computing device to:

employ message coding constraints on the encoded communication message sequence;

define possible message sequences based on a Markov model; and use a Viterbi algorithm to mitigate inter-symbol interference errors caused by vibrating surface resonant effects.

20. One or more non-transitory storage media having instructions stored thereon that when executed by a processing system direct the processing system to at least:

transmit radar waveforms at millimeter wave frequencies;

receive, from a vibrating transponder, vibrational backscatter of the radar waveforms;

determine an angle and range of the vibrating transponder from the vibrational backscatter of the radar waveforms;

perform synchronization on the vibrational backscatter of the radar waveforms to determine a start of an encoded communication message sequence;

calculate a predicted symbol sequence based on the encoded communication message sequence;

identify, from one or more predetermined messages, an actionable message from the predicted symbol sequence; and communicate the actionable message to a display of a vehicle or causing the vehicle to take an action.

* * * * *